Oct. 4, 1938.  T. A. FEE  2,131,729
THERMOSTATICALLY CONTROLLED VARIABLE THROW CRANKPIN MOUNTING DEVICE
Filed April 30, 1935   2 Sheets—Sheet 1
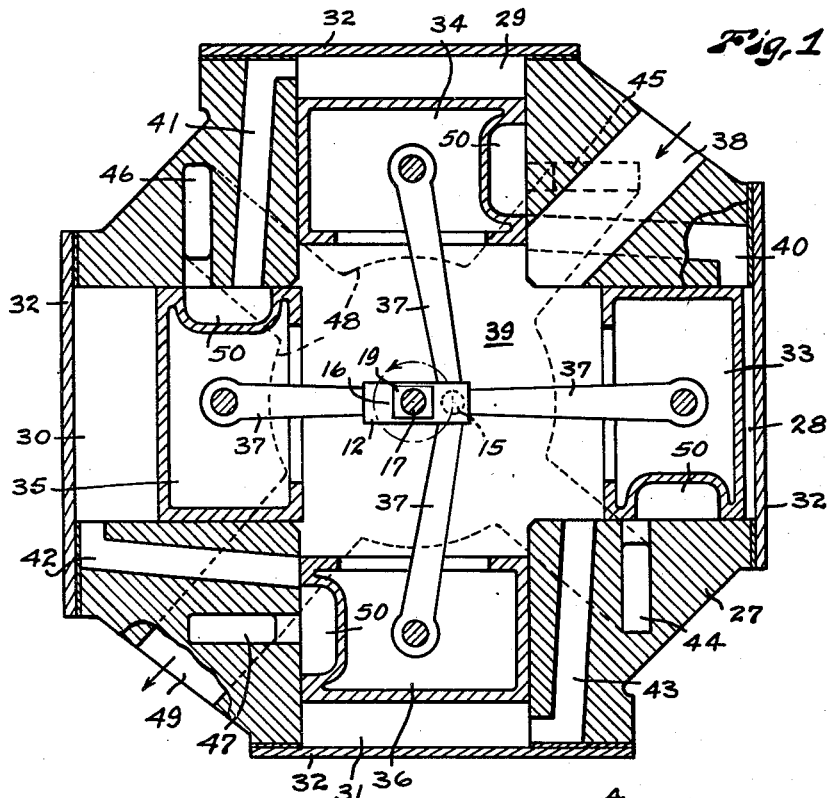
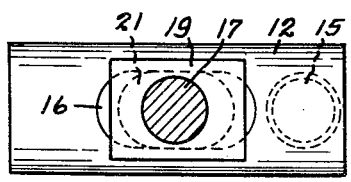
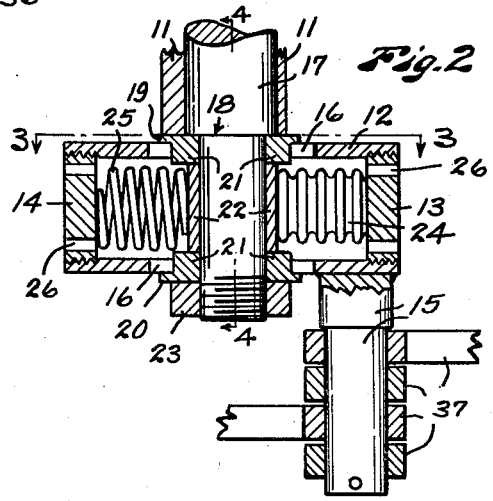
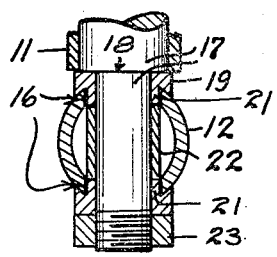
INVENTOR.
Thomas Arthur Fee
BY
*[signature]*
ATTORNEY Oct. 4, 1938.  T. A. FEE  2,131,729
THERMOSTATICALLY CONTROLLED VARIABLE THROW CRANKPIN MOUNTING DEVICE
Filed April 30, 1935   2 Sheets-Sheet 2

INVENTOR
Thomas Arthur Fee
BY
G. Wright Arnold
ATTORNEY

Patented Oct. 4, 1938

2,131,729

UNITED STATES PATENT OFFICE 2,131,729

THERMOSTATICALLY CONTROLLED VARIABLE-THROW CRANKPIN MOUNTING DEVICE

Thomas Arthur Fee, Vancouver, British Columbia, Canada, assignor to Gasoline Energy Distributors Limited, Vancouver, British Columbia, Canada, a corporation of British Columbia, Canada Application April 30, 1935, Serial No. 19,073

10 Claims. (Cl. 74—601)

This invention relates to a thermostatically controlled variable throw crank pin mounting device.

A primary object of this invention is to provide a crank pin so mounted that the lever arm of said crank pin may be thermostatically varied, so that the length of said lever arm may be automatically adjusted and controlled, as to temperature changes, to a predetermined degree.

For purposes of illustration and definiteness of disclosure, I will set forth my invention as applied to the metering devices for dispensing gasoline as the fuel for internal combustion engines. But it is to be understood that my invention is not to be restricted to any such specific use, but applies to devices where like conditions and like problems are involved.

Laws and standards regulating the measuring of liquids define units of measure, such as gallons, quarts, pints and the like, as a certain volume of the liquid at a specified temperature. As liquids are expanded in volume by an increase in temperature and contracted in volume by a decrease in temperature, it is obvious that any given amount of liquid measured at a temperature higher than the specified standard temperature will be less than the amount called for by standard requirements, while any given amount of liquid measured at a temperature lower than the standard temperature will be greater than the amount called for by standard requirements.

In metering devices as heretofore designed, having a metering chamber in the form of a cylinder, in which is operatively disposed a piston, relatively fixed adjustments are provided for initially setting the device in the form of eccentric sleeves, on which the crank pin is mounted. Manifestly, such adjustment does not provide for correcting automatically changes in temperature of the liquid being metered. For accurate metering, obviously changes must be provided for varying the volume of the metering chamber in accordance with changes of temperature of the liquid being metered.

A primary object of my invention is to achieve this by varying the throw of the crank pin automatically as the temperature change requires. Further, it is obvious that the change of temperature of the liquid induces expansion and contraction of the metallic parts forming the metering means which directly result in inaccuracy of measurement. Accordingly, it is a further object of my invention to correct for such inaccuracies, due to the expansion or contraction of the metallic parts, due to changes in the temperature of the liquid metered.

A primary object of my invention is to thermostatically automatically provide for the correction of inaccuracies due to changes in the temperature of the liquid metered and to provide a metering device of the cylinder piston type characterized by its precision of accuracy.

The above mentioned general objects of my invention, together with others inherent in the same, are attained by the device illustrated in the following drawings, the same being preferred exemplary forms of embodiment of my invention, throughout which drawings like reference numerals indicate like parts:

Figure 1 is a view in cross section of a liquid metering device having a thermostatically controlled variable throw crank pin mounting mechanism of my invention installed therein, the variable throw crank mechanism being shown in plan;

Fig. 2 is a longitudinal sectional view on an enlarged scale of a thermostatically controlled variable throw crank embodying this invention, parts being shown in elevation;

Fig. 3 is a view partly in plan and partly in section substantially on broken line 3—3 of Fig. 2;

Fig. 4 is a sectional view substantially on broken line 4—4 of Fig. 2, parts being shown in elevation and other parts being broken away;

Figure 5:
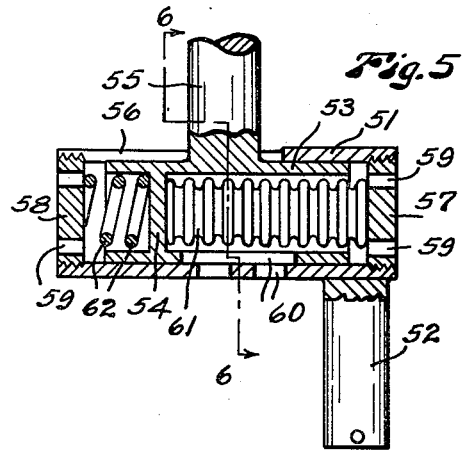
Fig. 5 is a longitudinal sectional view of a modified form of thermostatically controlled variable throw crank or crank pin mounting means embodying this invention, parts being shown in elevation.

In Figure 1 I have shown a thermostatically controlled throw crank means constructed in accordance with this invention, operatively installed in one well known form of liquid metering device, it being understood that this crank means may be used in connection with other metering devices employing crank movements.

Referring to Figs. 2, 3 and 4, which illustrate one preferred form of crank means, 12 is a tubular crank pin mounting member hereinafter termed a crank. 13 and 14 are screw plugs forming end closure means for the tubular crank 12. A crank pin 15 is rigidly secured to the crank 12 near one end thereof and extends at right angles therefrom. Diametrically opposite slots 16 are provided in the walls of the crank 12. A shaft 17 extends through the slots 16 at substantially right angles to the crank 12. The portion of the shaft 17 which extends through the crank 12 is preferably of smaller diameter than the remainder of such shaft so that a shoulder 18 is provided. 19 and 20 are two guide members which fit over the smaller end portion of the shaft 17 and engage the crank 12. These guide members are curved on the sides adjacent to the crank 12 and are respectively provided with inwardly projecting portions 21 which fit into the slots 16. A spacer sleeve 22 is provided on the shaft 17 between the two guide members 19 and 20. A nut 23 on the end of the shaft 17 is jammed tightly against the guide member 20. This rigidly secures the shaft 17, guide members 19 and 20 and sleeve 22 together and at the same time leaves these assembled parts free to be moved, as a unit, lengthwise of the crank 12. A thermostatic member 24, within the crank member 12, is interposed between one end closure means 13 and the sleeve 22. This thermostatic member 24, commonly called a sylphon, is preferably in the nature of an annularly corrugated tube of thin metal closed at both ends and filled with a thermostatic liquid. The thermostatic liquid in the member 24 may be the same kind of liquid which is to be metered. This will insure, for all temperatures, a variation of the thermostatic means proportional to the variation in volume of the liquid which is being metered. In other words, the effective length of the crank may be thermostatically varied, so that the length of the lever arm of the crank pin may be automatically thermostatically varied according to the temperature of the liquid being metered. A resilient means, in the form of a helical compression spring 25, may be interposed between the other closure means 14 and the side of the sleeve 22 opposite to that engaged by the thermostatic member 24. The spring 25 exerts a resilient pressure against the sleeve 22 and keeps the same always pressed tightly against the thermostatic member 24. If the liquid in the thermostatic member contracts, due to change of temperature, the thermostatic member 24 will contract longitudinally and the spring 25 will relatively move the shaft 17 and crank pin 15 transversely toward each other, thus shortening the throw of the crank means. If the liquid in the thermostatic member expands, the thermostatic member will be elongated and will relatively move the shaft 17 and crank pin 15 transversely away from each other, thus lengthening the throw of the crank means. When this crank means is in use it will ordinarily be positioned in the liquid which is being metered. Suitable passageways, as the slots 16 and openings 26 in the end closure means 13, permit a free circulation of the liquid which is being metered in the space around the thermostatic member 24. However, even without such liquid admitting openings, the conduction of the temperature changes through the metal parts has been found to be quite sufficiently quick in point of time to be practical in operation. This maintains the thermostatic member 24 at the same temperature as the liquid which is being metered and insures an adjustment of the throw of the crank means proportional to changes in the volume per unit of weight of the liquid being metered. The expansion and contraction of the liquid in the thermostatic device 24 is always sufficient to overcome the pressure of the spring 25 but said spring 25 will not yield to any of the thrusts resulting from the normal operation of the metering device on which this variable throw piston means is installed.

In cranks used in metering devices of this nature it is common practice to provide an eccentric sleeve on the exterior of the shaft. This sleeve is rigidly secured to the shaft when the device is in use, but is capable of adjustment around the shaft to vary the throw of the crank pin and provide a correct initial setting. I have shown a sleeve 11 of this nature on the shaft 17. This type of eccentric sleeve is more fully disclosed in connection with Figs. 9 and 10.

In Figure 1 I show one adaptation of this invention in connection with a displacement meter of a form commonly used for metering or measuring gasoline. This displacement meter comprises a block 27 having four radial cylinders 28, 29, 30 and 31 positioned at angular intervals of ninety degrees about a common center which corresponds to the axis of rotation of the shaft 17. Each radial cylinder is provided with an end plate 32. Four pistons 33, 34, 35 and 36 are provided in the respective cylinders 28, 29, 30 and 31. Each piston 33, 34, 35 and 36 is provided with a connecting rod 37. It is common practice to connect all of these connecting rods 37 with the crank pin of a non-adjustable crank means, i. e., non-adjustable other than the initial setting by means of said eccentric sleeve. This connects all of the pistons together in such a manner as to insure an equal length of stroke for all of the pistons. In accordance with this invention I replace the usual non-adjustable crank means by my variable throw crank means in which the distance between the axis of the crank pin 15 and the axis of the shaft 17, about which the crank pin rotates, is adjustable and is automatically varied by the thermostatic means 24 in addition to said non-automatic eccentric sleeve adjustment. This thermostatic means 24 is subject to the temperature of the liquid which is passing through the displacement meter. This makes it possible to provide a thermostatic control for varying the stroke of the pistons in the cylinders in proportion to changes of the temperature of the liquid which is being metered. The liquid expands and contracts in response to temperature changes and this makes it possible to compensate for expansion and contraction of the liquid and insures a correct measuring or metering of the liquid, irrespective of temperature changes. It will be understood that such eccentric sleeve may be omitted altogether in the device embodying my invention, and the initial adjustment accomplished by adjusting the end closure means 13. If desired, when 13 is adjusted, closure 14 may also be adjusted to compensate for the spring stress imposed upon thermostatic means 24.

An inlet port 38 is connected with a central chamber 39 which is formed between the several cylinders 28, 29, 30 and 31. Four by-pass ports 40, 41, 42 and 43, respectively, connect the outermost end portions of the cylinders 28, 29, 30 and 31 with the inner end portions of the cylinders 29, 30, 31 and 28. Four outlet ports 44, 45, 46 and 47 are connected with the respective cylinders 28, 29, 30 and 31. These outlet ports connect with a common outlet chamber 48 which is provided at one end of the block 27. The chamber 48 is shown by dotted lines in Fig. 1. A discharge passageway 49 is connected with the chamber 48. The by-pass ports 40, 41, 42 and 43 connect with the inner portions of the cylinders a short distance from inner ends of said cylinders. The discharge ports 44, 45, 46, and 47 intersect the cylinders a short distance outwardly from the by-pass ports. The pistons 33, 34, 35 and 36 are each provided with an external recess 50 in the circumferential portion thereof in registration with the by-pass and discharge ports and said pistons operate as slide valves to control the opening and closing of the by-pass and discharge ports.

Liquid under pressure entering the chamber 39 through the port 38 will operate the pistons reciprocably in the cylinders. The reciprocation of the pistons will operate the crank means connected with the connecting rods 37 and the operation of this crank means will operate registering means of well known form, not shown, which will indicate the amount of liquid which has passed through the displacement meter.

Briefly, the operation of this metering device is as follows: With the pistons in the position shown in Figure 1 and the crank means moving in a counterclockwise direction, the piston 36 is being moved inwardly by pressure of liquid entering through port 43. The piston 34 is expelling liquid through port 41, recess 50 of piston 35, port 46, chamber 48 and passageway 49. The piston 33 has just completed its outward stroke and is ready to begin to move inwardly under the influence of liquid under pressure received through port 40, which will be uncovered upon further movement of piston 34. The piston 35 has just completed its inward stroke and is ready to begin to move outwardly and expel the liquid between it and the end plate through port 42, recess 50 of piston 36, port 47, and passageway 49. In this connection it is noted that piston 36 is just beginning to open port 42 in the position shown in Figure 1. From the above description it will be seen either one or two of the pistons will always be acting as power pistons and receiving liquid in their respective cylinders while one or both of the other pistons will be discharging the measured amount of liquid which has entered their cylinders on the previous piston stroke.

Figure 6:
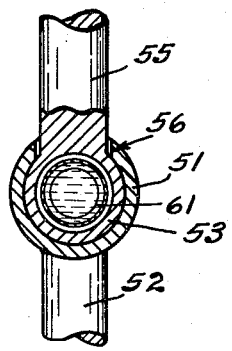
Fig. 6 is a cross section substantially on broken line 6—6 of Fig. 5, parts being shown in elevation.

Figs. 5 and 6 disclose a thermostatically controlled variable throw crank means of a modified form of construction. In these figures, 51 is a tubular crank member having a crank pin 52 fixedly secured thereto. 53 is a tubular slide member disposed within the crank member 52. A transverse partition 54 is provided within the slide member 53. A shaft 55 extends through a slot 56 in the tubular crank member 51 and is rigidly secured to the slide member 53. Two end closure members 57 and 58 are provided in the tubular crank member 51. Spanner holes 59 in these closure members may also serve to promote a free circulation of liquid within the crank member 51 and slide member 53. Additional liquid circulation openings 60 may also be provided in parts 51 and 53. A thermostatic member 61 is interposed between one end closure member 57 and the partition 54 and a compression spring 62 is interposed between the other end closure member 58 and the partition 54. The thermostatic member 61 and spring 62 operate in substantially the same manner as the previously described corresponding parts to vary the axial distance between the shaft 55 and crank pin 52 in response to changes of temperature of the thermostat 61. The slide 53 within the crank member 51 has the partition 54 positioned off center as respects the shaft 55 and provides for the use of a longer thermostatic member.

Figure 7:
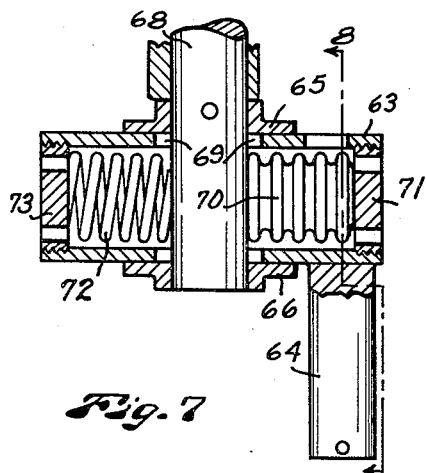
Fig. 7 is a longitudinal sectional view of another modified form of thermostatically controlled variable throw crank or crank pin mounting means embodying this invention.
Figure 8:
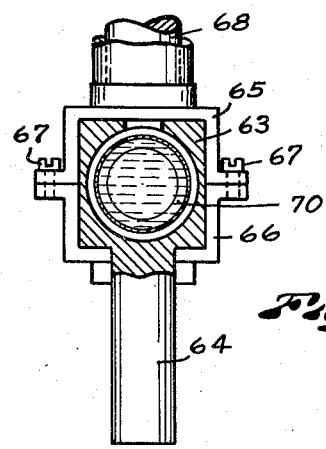
Fig. 8 is a cross section, with parts in elevation, taken substantially on broken line 8—8 of Fig. 7.

Figs. 7 and 8 disclose another alternative form of variable throw crank means comprising a tubular crank member 63 preferably of square cross section externally. A crank pin 64 is secured to the crank member 63 near one end thereof. A slide, which may be formed of two parts 65 and 66 secured together by screws 67, is provided on the exterior of the crank member 63. A shaft 68 extends through the slide 65—66 and through suitable slots 69 in the crank member 63. A thermostatic member 70 is interposed between one side of the shaft 68 and an end closure member 71. A spring 72 is interposed between the other side of the shaft 68 and another end closure member 73. The operation of this variable throw piston means is substantially the same as the operation of the previously described forms of the device.

Figure 9:
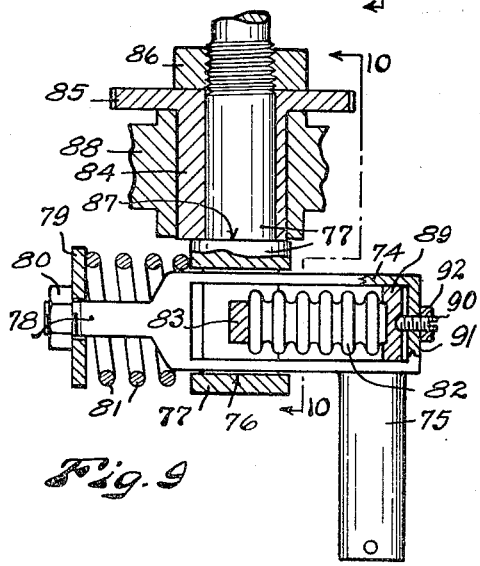
Fig. 9 is a longitudinal section of another modified form of the invention.
Figure 10:
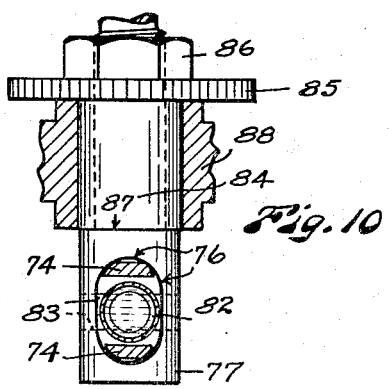
Fig. 10 is a view partly in elevation and partly in cross section substantially on broken line 10—10 of Fig. 9.

Figs. 9 and 10 show another alternative form of the invention comprising a crank member 74 in the shape of an open rectangular frame. The crank member 74 has a perpendicular crank pin 75 rigidly connected therewith near one end. The crank member 74 extends through a transverse slot 76 in a shaft 77. A stem 78 of reduced size is provided on the crank member on the opposite side of the shaft 77 from the crank pin 76. This stem 78 has a washer 79 supported by a nut 80. A compression spring 81 is interposed between the washer 79 and the shaft 77. A thermostatic member 82 is provided in opposed relation to the spring 81. This thermostatic member 82 is interposed between a support 89 at the outer end of the crank member 74 and a cross key 83 which extends transversely through the shaft 77. A screw 90 threaded through the end 91 of the crank 74 serves as an adjustable thrust member for the support 89. A lock nut 92 may be provided on the screw 90. The screw 90 provides a manually operated means for initially adjusting the distance between the crank pin and the shaft irrespective of the actual over all length of the thermostat member. This same function may be accomplished by the adjustable end closure means 13, 57 and 71, in the preceeding figures. In the device shown in Figs. 9 and 10 expansion of the liquid in the thermostatic member 82 will elongate the thermostatic member, compress the spring 81 and relatively move the crank pin 75 and the shaft 77 farther apart while contraction of the liquid in said thermostatic member 82 will shorten the thermostatic member 82 and allow the spring 81 to relatively move the shaft 77 and crank pin 75 closer together.

In connection with cranks used in liquid metering devices it is common practice to provide means for manually adjusting the distance between the crank pin and the axis of rotation about which the crank rotates. This makes possible a correct initial adjustment of the metering device, but does not provide for automatic adjustment to compensate for changes of temperature. One manually adjustable means commonly used in connection with cranks of this nature is in the nature of an eccentric sleeve provided on the shaft of the crank member, said sleeve being manually adjustable but being fixed as respects the shaft during operation of the metering device. In Figs. 9 and 10 I have shown a manual adjusting means of this nature in the form of an eccentric sleeve 84 on the shaft 77. The sleeve 84 is provided at the upper end with a hand wheel 85 by which it may be angularly adjusted on the shaft 77. A nut 86 is provided for clamping the eccentric sleeve 84 against a shoulder 87 on the shaft 77 after said sleeve has been adjusted to proper position. When the sleeve 84 is clamped to the shaft 77 the two will rotate as a unit and the center of rotation of the crank will be the axis of the sleeve rather than the axis of the shaft 77. The sleeve 84 may be journaled in any suitable bearing 88, a fragment of which is shown. It will be understood that this eccentric sleeve adjustment may be retained or may be omitted as previously set forth, in the devices embodying my invention.

In correcting for the expansion and contraction of the metals composing the piston and cylinder walls and parts of the meter, my invention provides for compensating for slippage of gasoline past the friction surfaces of the reciprocating parts. In the meters of common practice design, obviously allowance must be made for clearance between the piston and the cylinder walls. This clearance will be reduced by metallic expansion when the gasoline temperature is raised and such clearance on the other hand will be greatly increased by metallic contraction when the temperature of the gasoline is lowered. Accordingly, there is in the devices, as presently manufactured, a great variance in the amount of slippage past the reciprocating surfaces of the meters. My invention provides for the correction of such "slippage" in the amount metered. In achieving this correction I add to the liquid in the bellows 24 which for the most part may be the same as the liquid being metered, or have the same thermal coefficient of expansion as the liquid being metered) a second liquid which has a higher thermal coefficient of expansion than the liquid being metered. This provides for the lever arm of the crank pin to be of such magnitude as to provide the required allowance for the slippage past the piston surfaces.

In the metering of gasoline, the amount of such second liquid is determined by the amount of gasoline required to make allowance for such gasoline as slips by the pistons, due to the difference of fit of the pistons and cylinder walls, which fit varies according to the expansion and contraction arising by virtue of the change of temperature of the liquid being metered. To enable the pistons to operate over a range of temperatures, obviously a clearance for the pistons must be made. Manifestly, over a range of 50° variation in temperature, the slippage will increase for lower temperatures. By having the expansion of the liquid in the bellows 24 greater than that required for the variation directly due to temperature, I make provision for allowing for the contraction of the metal contacting parts. The amount of the "slippage" will vary with the different makes of meters. Also the amount of such slippage will vary somewhat by the amount of wear for which correction has not been made.

Obviously, changes may be made in the forms, dimensions, and arrangement of the parts of my invention, without departing from the principle thereof, the above setting forth only preferred forms of embodiment.

I claim:

1. A device of the character described, embodying a crank pin; a crank pin mounting member; a guide member slidably mounted on said pin mounting member; a shaft on which said guide member is mounted; and a thermostatic means carried by said pin mounting member and bearing against said guide member.

2. A device of the character described embodying a shaft; a transverse guide means fixedly mounted thereon, said guide means having a partition dividing the said guide means into two compartments; a housing member slidably mounted with respect to said guide means, said housing member having end closing means; a crank pin fixedly mounted upon said housing member; a thermostatic member disposed in one of said guide means compartments bearing, as respects one end, upon said partition, and as respects the other end, upon one end of the enclosing means of said housing member; and a spring in the other compartment bearing, as respects one end portion, upon said partition, and as respects the other end, upon the other end closing means of said housing member.

3. In a variable throw crank means, a crank; a crank pin mounted on said crank; a shaft slidably connected to said crank; and a thermostatic means carried by said crank and bearing against said shaft whereby the length of crank arm between the axes of said shaft and said crank pin is determined.

4. In a variable throw crank means, a crank; a crank pin mounted on said crank; a shaft slidably connected to said crank; a thermostatic means carried by said crank and bearing against said shaft whereby the length of crank arm between the axes of said shaft and said crank pin is determined; and resilient means carried by said crank bearing against said shaft in opposition to said thermostatic means.

5. In a thermostatically controlled variable throw crank means, a tubular crank member having slot means in the wall thereof; closure means for the ends of said crank member; a crank pin connected with said crank member; a shaft perpendicular to said crank member and parallel to said crank pin extending through said slot means in said crank member; thermostatic means in said crank member interposed between said shaft and the closure means at one end of said crank member; and resilient means urging said shaft toward said thermostatic means.

6. In a thermostatically controlled variable throw crank means, a shaft having a transverse opening extending therethrough; a crank member extending through said opening at substantially right angles to said shaft, said crank member having an open central portion and having closure means at an end; a crank pin rigid with said crank member extending at substantially right angles therefrom; a cross key in said shaft extending through said crank member; and thermostatic means interposed between said cross key and the end closure means of said crank member and resilient means urging said shaft toward said thermostatic means.

7. In a thermostatically controlled variable throw crank means a shaft having a transverse opening therethrough; a crank member having an open frame like portion extending through said opening; a stem on one end of said crank member; a compression spring mounted on said stem and engaging said shaft; a crank pin operatively connected with craid crank member; a cross key in said shaft extending through the open frame like portion of said crank member; and thermostatic means interposed between said cross key and said crank member in opposed relation to said compression spring.

8. In a thermostatically controlled variable throw crank means, a crank; a crank pin mounted on said crank; a shaft slidably mounted on said crank, the distance between the axes of said shaft and said crank pin being thus rendered variable; thermostat means interposed between one end portion of said crank and said shaft thermostatically controlling the relative distance between the axes of said shaft and said crank pin; and manually operated adjusting means operatively disposed as respects said thermostat providing initial adjustment between said shaft and said crank pin.

9. In variable throw crank means, a crank; a crank pin operatively connected with said crank; a shaft slidably mounted on said crank, the distance between the axes of said shaft and said crank pin being thus rendered variable; and thermostatic means interposed between said shaft and one end portion of said crank, said means comprising a chamber formed by bellows and said chamber having liquid therein having the same coefficient of expansion as liquid which may be permitted to contact the exterior of the thermostatic means.

10. In variable throw crank means, a crank; a crank pin operatively connected with said crank; a shaft slidably mounted on said crank, the distance between the axes of said shaft and said crank pin being thus rendered variable; and thermostatic means interposed between said shaft and one end portion of said crank, said means comprising a chamber formed by bellows and said chamber having two types of liquids therein, one having the same coefficiency of expansion and the second liquid having a higher coefficient of expansion than liquid which may be permitted to contact the exterior of the thermostatic means.

THOMAS ARTHUR FEE.